Figure 1A:
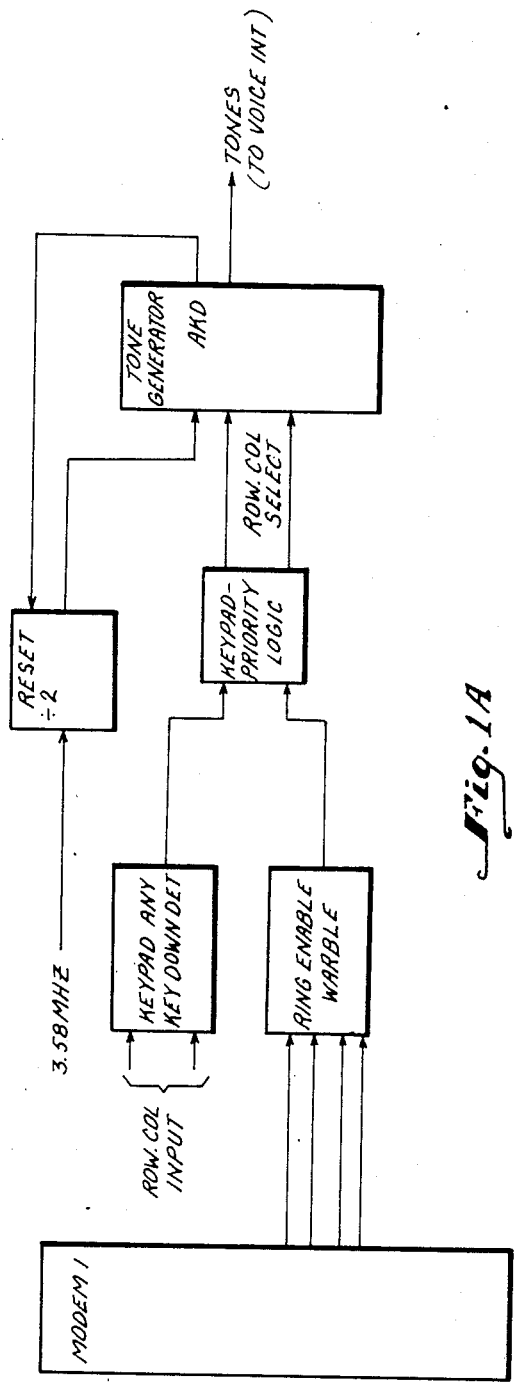

United States Patent [19]

Daie et al.

[11] Patent Number: 4,669,110
[45] Date of Patent: May 26, 1987

[54] CALL PROGRESS TONE SYSTEM

[75] Inventors: Hedayat Daie, Cary; Charles H. Marsh; Joe L. Turner, both of Raleigh, all of N.C.

[73] Assignee: ITT Corporation, New York, N.Y.

[21] Appl. No.: 791,263

[22] Filed: Oct. 25, 1985

[51] Int. Cl.⁴ .............................................. H04M 3/00
[52] U.S. Cl. .................................... 379/165; 379/353; 379/361; 379/375
[58] Field of Search ........... 179/84 VF, 84 T, 99 LC, 179/99 R, 99 A, 81 R, 18 AD; 379/165, 353, 361, 375

[56] References Cited

U.S. PATENT DOCUMENTS 4,322,581  3/1982  Christain et al. ......... 179/18 AD X
4,571,462  2/1986  Junssen ..................... 179/84 VF X Primary Examiner—James L. Dwyer
Attorney, Agent, or Firm—John T. O'Halloran

[57] ABSTRACT

A tone source is located at each telephone set of a private branch exchange (PBX) or a key telephone system. The tone source provides call progress tones and warble ring tone, as well as a feedback tone in response to the depression of telephone set keypad buttons by the user. The signaling to the central system unit is transmitted via a digital link.

4 Claims, 4 Drawing Figures

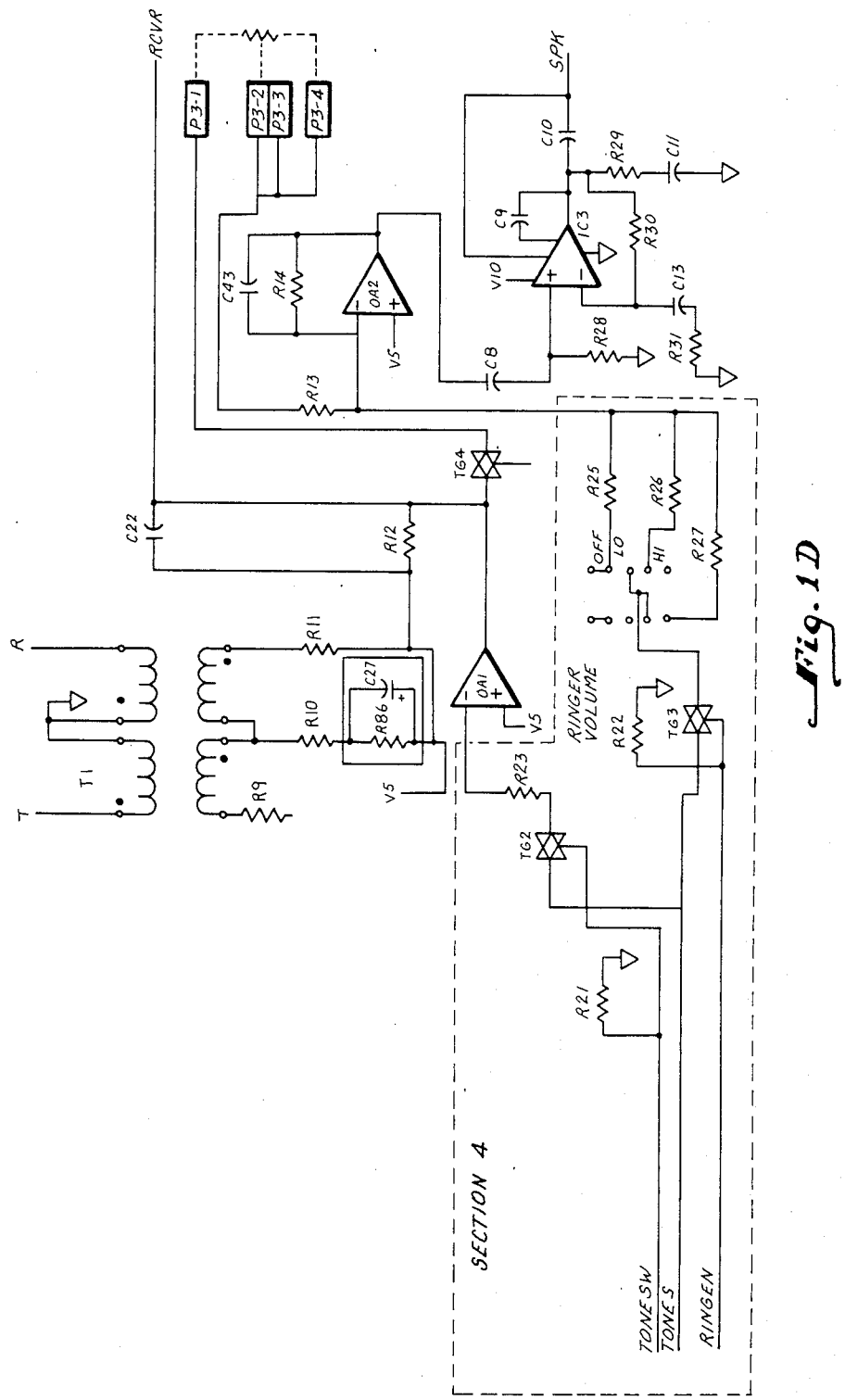

CALL PROGRESS TONE SYSTEM

The invention relates to the provision of tones for a communication system.

In known private branch exchange (PBX) and key telephone systems, call progress tones are generated by the central system units, and not by the individual telephone sets of the systems. Call progress tones include busy tone, dial tone, ring back tone, and camp on tone, for example. In such known systems, the telephone system signaling tones, which are dual-tone multifrequency (DTMF) signals, are generated in the telephone set and are decoded at the central system unit.

Previous tone source implementations have not combined the generation of confidence tones, call progress tones, and ringer tones into one unit. Confidence tones are generated in response to a mechanical action on the part of the user (viz. pressing a button) and serve as confirmation that the action is recognized by the equipment. Confidence tones usually consist of single tone, or additive pair, and may persist for the entire duration of the user's action, or may persist for only a short period of time. Call progress tones are generated to notify the telephone system user of the status of calls being placed. Examples are system dial tone, system busy tone and reorder (equipment busy) tone. Call progress tones usually consist of a single tone, or additive pair and are often distinguished by cadence. Ringer tones are generated to alert the user of an incoming call. Ringer tones usually consist of an alternating pair of tones with the tone frequencies and alternating frequency chosen to produce a warbling sound like a mechanical gong ringer.

In PBX and key telephone systems, it is desirable to eliminate DTMF detectors and DTMF generators from the system and accomplish the signaling by a digital link. In a system employing the invention, the signaling to the central system unit is transmitted via a digital link. However, with the DTMF detector and generator removed, the user does not receive any audio feedback in response to dialing, that is, the depression of telephone set keypad buttons by the user, so a tone source is employed at each telephone subset that can perform this function. This tone source is also used to produce call progress tones to the telephone user. Call progress tone sources and the associated switching circuits are eliminated from the PBX or key telephone central system unit, thus resulting in a reduction of system cost and complexity.

The same tone source in the telephone can produce call announce tone and ring tone out of a loud speaker. It is, however, desired to generate a warble tone for ring. Thus, the tone source provides two frequencies, one that is about 400 Hertz (Hz) for dial tone and one that is a few hundred Hz higher. The tone frequency is switched between the two frequencies. If data transmission from the system to the telephone is arranged for every 40 milliseconds, then at this rate, every frame of received signal can toggle the oscillator frequency and cause a warble sound.

By employment of the single tone source, tone feedback for the key pad, call progress tones, and warble ring are provided, with an attendant cost reduction. The ring can come out of the same loud speaker as the handsfree circuit, since the tone source is already connected to the audio circuits for call progress tones.

Each individual telephone set does not require either a DTMF dialer or a pulse dialer, nor does each set require a DTMF decoder in the central system unit. Additionally, the central system unit does not require switching for either DTMF decoders or for call progress tones. The central system unit does not employ call progress tone sources, since call progress tones are provided by each individual telephone set.

Tones can propagate back to the central system unit, so that non-system parties to telephone calls on the system can hear tones, such as conference tones.

The invention provides means of generating confidence, call progress and warbling ringer tones from a single tone source located in the telephone instrument. Telephone instrument cost is reduced by combining confidence and ringer tone sources into a single unit. System cost is reduced by the elimination of call progress tone sources and related switching circuitry in the common system equipment. The invention also provides a means of control wherein the tone source function is determined by signals originating either locally (confidence tone) or remotely (call progress or ringer tones). Furthermore, the invention provides a means of connecting the tone signals produced by the tone source to different points in the telephone audio circuitry such that tones may be heard through both handset and receiver (call progress or confidence tones) or through the speaker only (ringer tones). This means permits the warbling ringer tones to be generated while a call is in progress without interference (off-hook ringing).

Figure 1B:
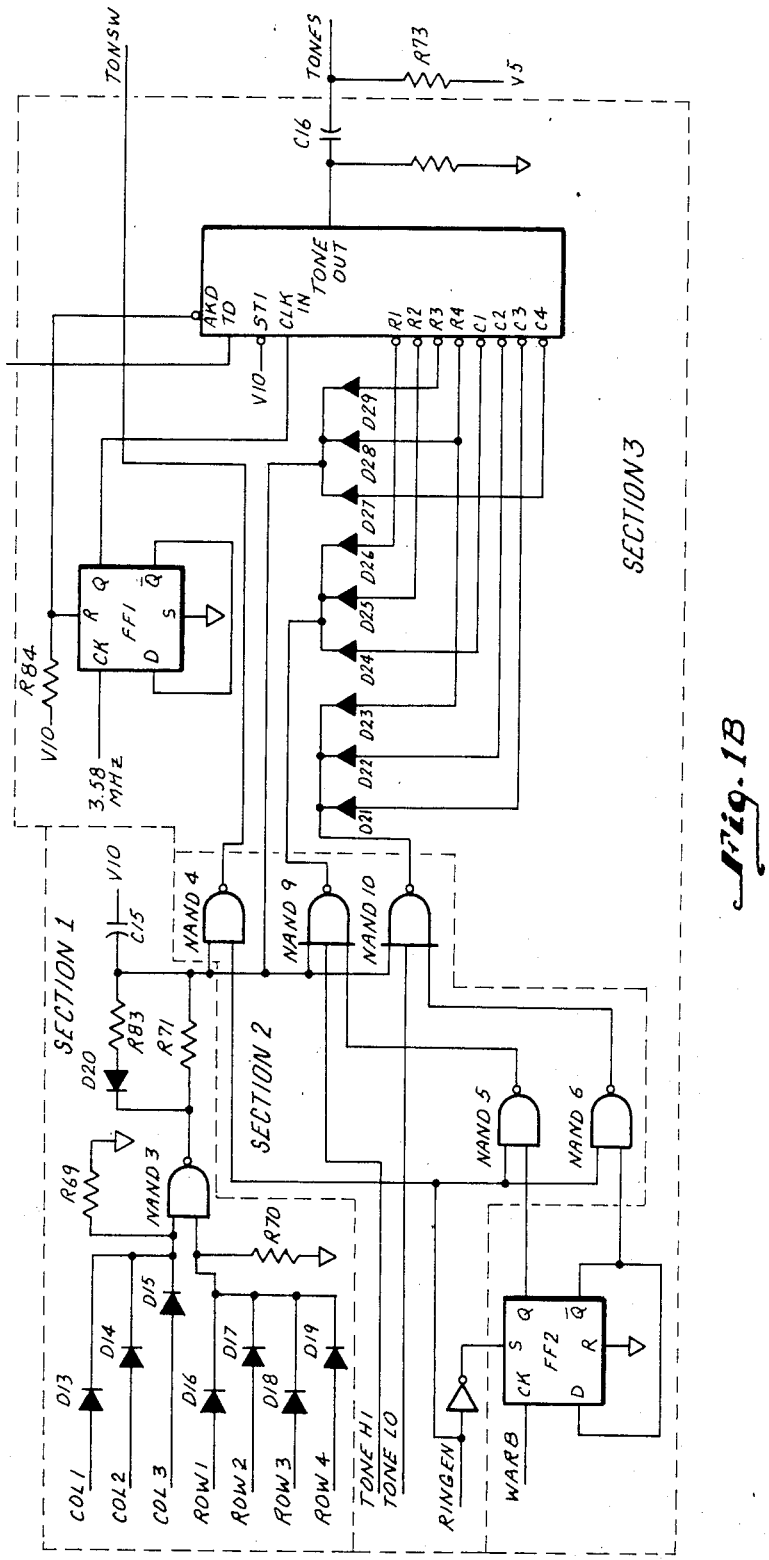
Figure 1C:
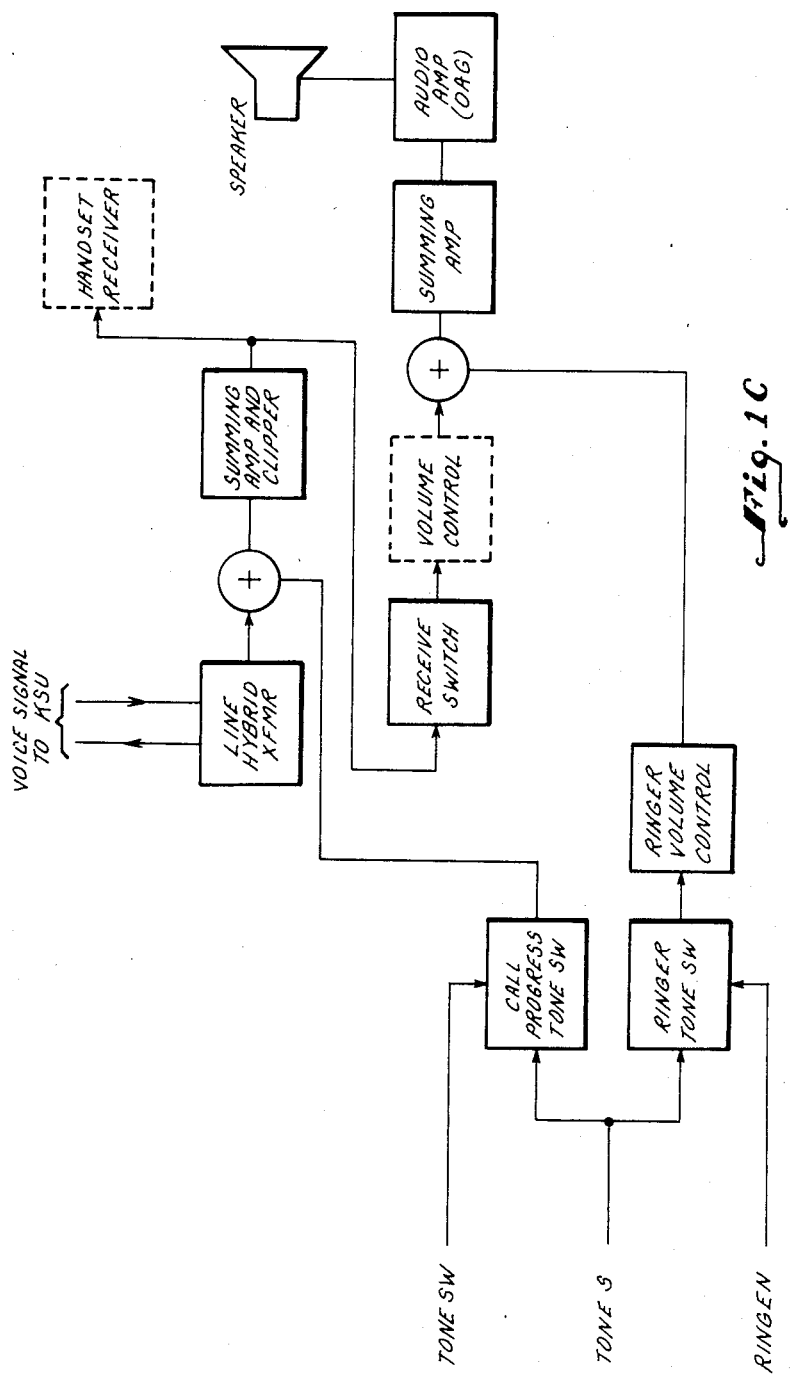

Principles of the invention may be better understood from a reading of the following description in conjunction with the drawing in which:

FIGS. 1A, 1B, 1C, and 1D show a detailed schematic diagram of a key telephone system incorporating the invention.

An exemplary system employing the invention is, for example, as disclosed in pending U.S. patent application Ser. No. 687,626, filed Dec. 31, 1984, of H. Daie now abandoned, and in the copending U.S. patent application Ser. No. 791,262 of H. Daie, filed concurrently herewith, entitled "Mixed Mode Dialing System", both of which are incorporated herein by reference. Such a system is shown in part in the drawing, and is sold commercially as the ITT ARIES EKS-401 by ITT Corporation. The system dial tone, ringback tone, busy tone, ring tone, etc. are located in the subset. These tones are generated using one tone source. As shown in section one, local control of dialpad confidence tone is achieved via COL1, 2, 3, and ROW1, 2, 3, 4 signals. When any dialpad key is depressed, a 1 millisecond pulse is generated at the output of NAND3. This pulse is then elongated using a pulse stretching circuit. The stretched pulse is NANDed with RINGEN signal and is called TONSW. RINGEN is simply TONEHI and TONELO ANDed together.

Section two of the FIGURE accommodates the control of all other call progress tones and ring signals by the system. Two tone frequencies may be selected under system control to produce all call progress tones except the warble ring signal. The logic signals TONEHI and TONELO enable the high and low frequencies tones respectively. The ring signal is generated by toggling the TONEHI and TONELO at ½ the frequency of WARB signal. The WARB signal represents the arrival of new frames of data from the KSU and its rate is approximately 40 Hz.

Section three contains the only source in the subset. The tone source is a standard DTMF generator with a ½ standard clock rate. The half speed clock rate allows the DTMF tones to be translated to the frequency range of call progress tones. The DTMF generator requires a DC bias load resistor on its output. A capacitor is also used to block the DC voltage of the generator from interfering with the next stage of circuitry.

Section four illustrates the implementation of tone injection into the audio paths. The TONSW signal enables the TONES to be passed through the TG2 transmission switch and on to the loudspeaker or the handset receiver. T1 transformer couples the audio circuitry to the system. The received signal is mixed with the tones using the summing function provided by OA1, R23, R11. Components R86, C27, R9, R10 form a 4 wire to 2 wire circuit in conjunction wth T1. C22, and R12 form a low pass filter with OA1. The output of OA1 is directed to the handset receiver as well as to TG4 transmission switch. TG4 is enabled when the tones are required to be sent to the loudspeaker. When warble ringing is required, RINGEN enables TG3 to pass the ring signal to the loudspeaker circuit. TG3's output passes through a ringer volume control circuit formed by a 4 position switch, R27, R26, R25. The ringer signal is added to the call progress tones using OA2. A power amplifier and associated circuitry are used to drive the loadspeaker. The loudspeaker is used for speakerphone, call progress tones, and the warbled ring signal.

The invention can be implemented using various circuit configurations, and has broad application in customer premise switching systems. It can be used in any analog or digital PBX or key telephone system that interface to the central office through a 2 wire analog interface. It can also be used for systems employing communication sets, such as personal computer and data terminals, whether or not in combination with telephone sets.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

I claim:

1. A communication system, comprising:
   means, located at a communication set of said system, for providing tones including call progress tones for said set;
   means, coupled to said tone means, for coupling control signals for said tone means from a central unit of said system,
   means, coupled to said tone means, for coupling said tones to an audio unit of said communication sets, wherein said tone means comprises:
   means for generating a first single frequency;
   means for generating a second single frequency;
   means, coupled to said first and second single frequency generating means, for selectively switching between said first and second single frequency generating means to produce one of said tones comprised of a selectable combination over time of said first single frequency and said second single frequency; and
   means, coupled to said switching means, for providing said switched frequency to said tone coupling means.

2. A communication system according to claim 1, wherein said tone means further comprises means for generating a confidence tone frequency, in response to depression of a keypad of said communication set.

3. A communication system according to claim 1, wherein said tones further include ring tones and keypad dialing feedback tones.

4. A communication system according to claim 1, wherein said control signal coupling means comprises a digital link.

* * * * *